United States Patent [19]
O'Connor

[11] 3,855,450
[45] Dec. 17, 1974

[54] LOCOMOTIVE ELECTRIC CAB HEATER AND DEFROSTING UNIT

[75] Inventor: Jon F. O'Connor, Evanston, Ill.

[73] Assignee: Vapor Corporation, Chicago, Ill.

[22] Filed: Oct. 1, 1973

[21] Appl. No.: 402,371

[52] U.S. Cl.................. 219/367, 98/2.08, 165/127, 219/202, 219/203, 219/364, 219/370, 237/12.3 B
[51] Int. Cl......... H05b 1/02, F24h 3/04, B60h 1/22
[58] Field of Search .......................... 219/366–368, 219/369–371, 374–376, 364, 202, 203; 126/110 AA; 98/2.05, 2.08; 237/12.3 B, 12.3 C, 12.3 R; 165/122, 126, 127

[56] References Cited
UNITED STATES PATENTS

| | | | |
|---|---|---|---|
| 1,798,290 | 3/1931 | Winner et al. .................... | 219/368 |
| 2,249,957 | 7/1941 | Holmes ......................... | 237/12.3 B |
| 2,471,784 | 5/1949 | Seifner et al. ................ | 219/370 UX |
| 2,492,315 | 12/1949 | Osterheld ....................... | 219/366 X |
| 2,655,092 | 10/1953 | Spooner ........................ | 165/127 X |
| 2,699,323 | 1/1955 | Bergstrom ...................... | 165/127 X |
| 2,721,254 | 10/1955 | Burgess .......................... | 219/368 |
| 2,724,044 | 11/1955 | Campbell ......................... | 219/368 |
| 2,746,726 | 1/1956 | Hoff ................................. | 165/127 X |
| 3,111,573 | 11/1963 | Crowe et al. ................... | 219/368 X |

Primary Examiner—A. Bartis
Attorney, Agent, or Firm—Lloyd L. Zickert

[57] ABSTRACT

A locomotive cab heater including a housing having a fan mounted therein for pumping air over a bank of electric heating panels. A blower may also be provided to give a defrosting action. The blower pumps air to defroster conduits for defrosting windows in the locomotive cab while the fan pumps heated air into the cab for maintaining a heated temperature for the operating personnel. Control means permits plural temperature levels to be provided and to reduce the power level in the electric heating panels in the event the blower and fan fail.

8 Claims, 7 Drawing Figures

FIG.1
FIG.2
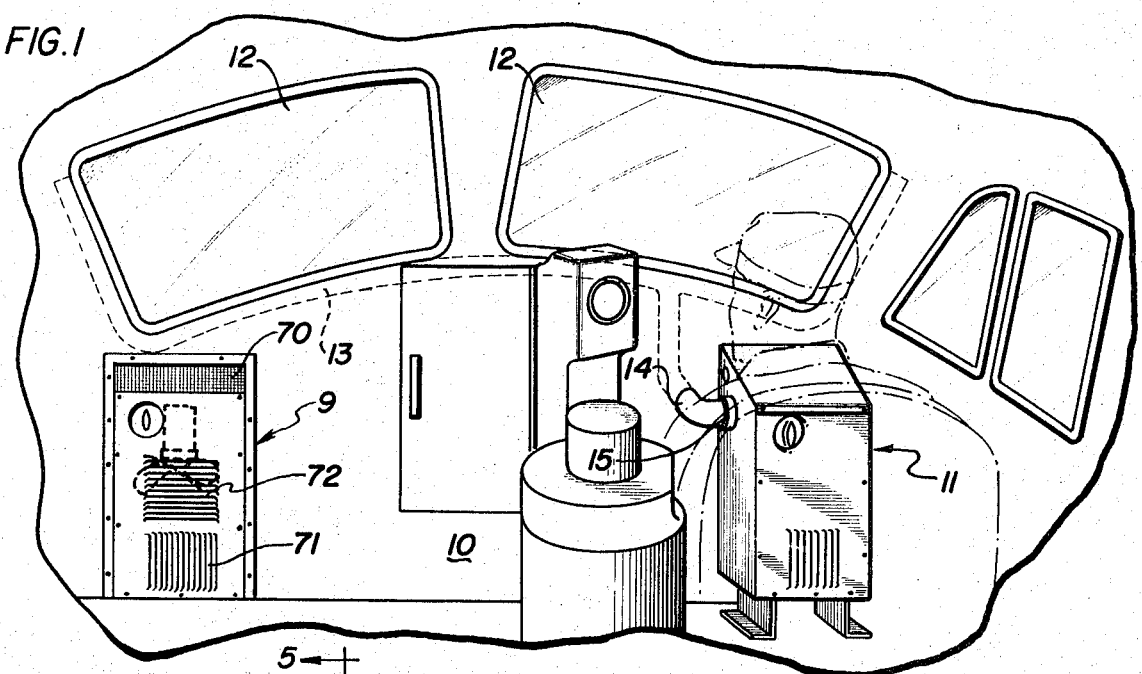
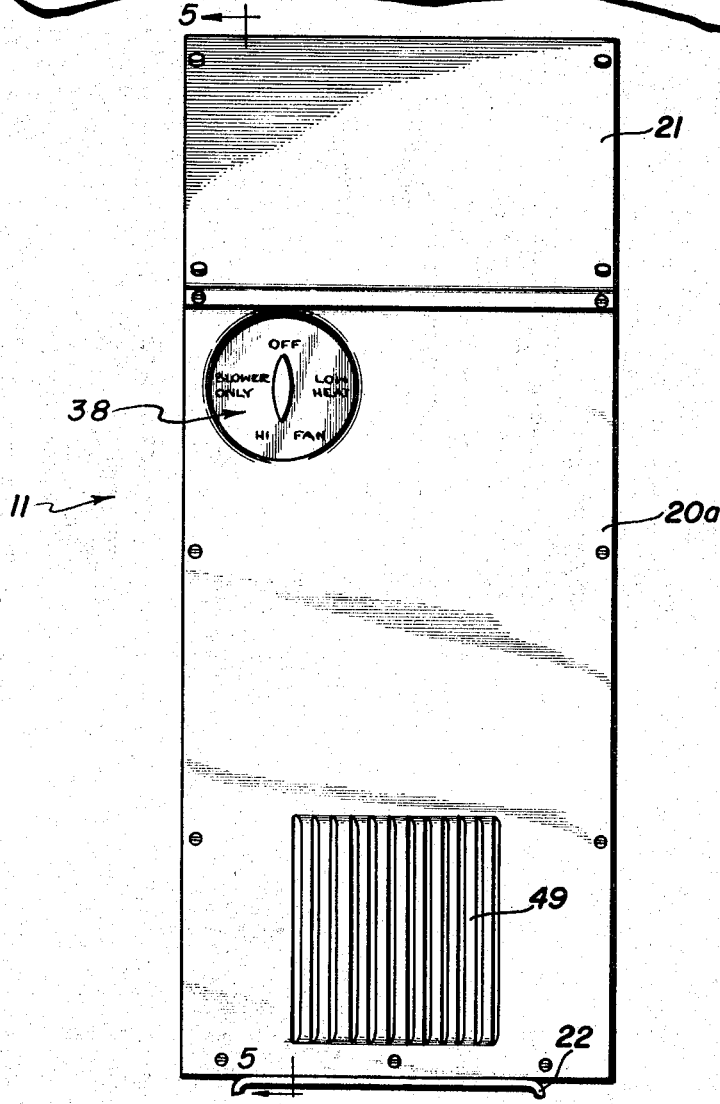

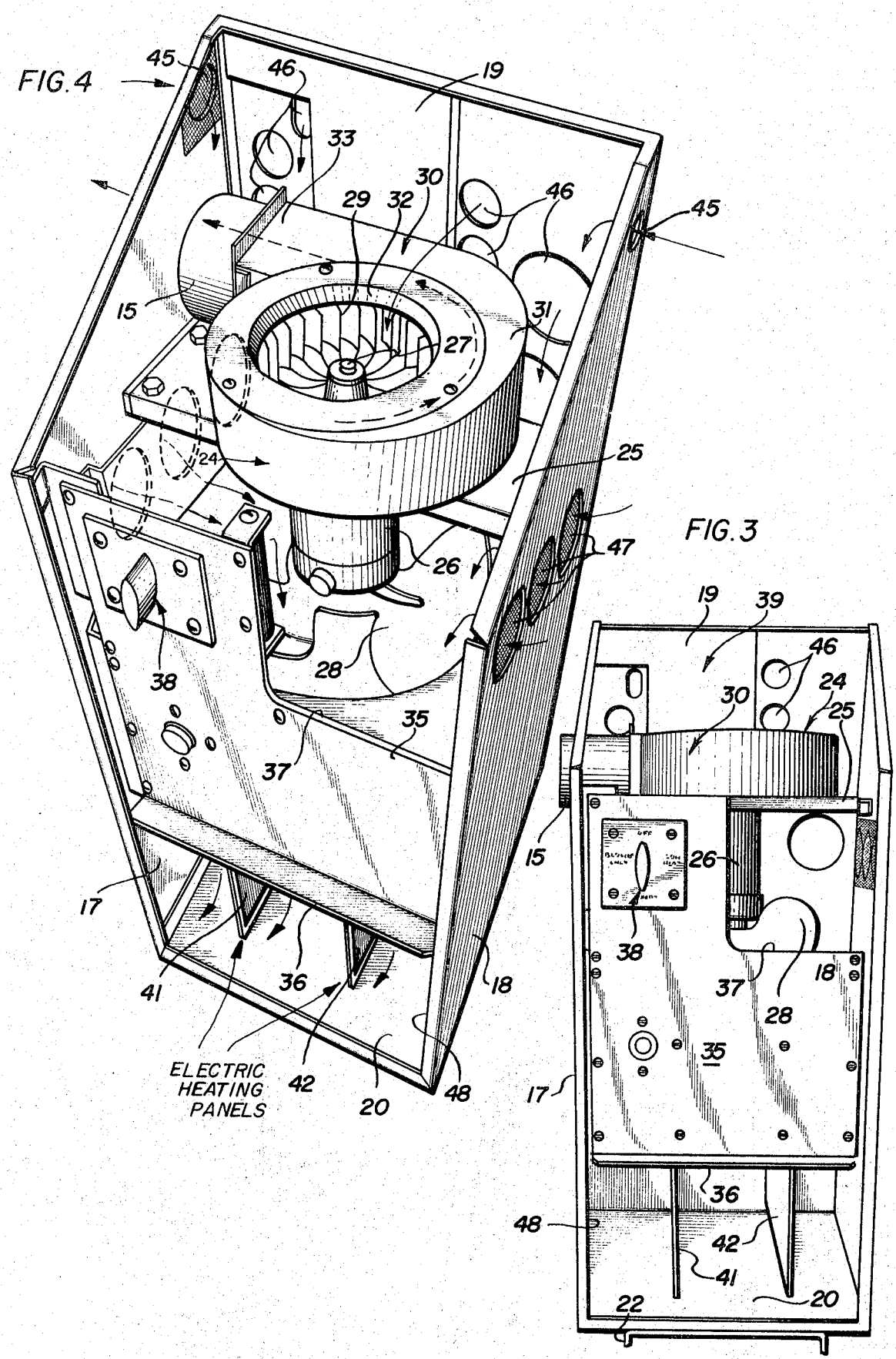

LOCOMOTIVE ELECTRIC CAB HEATER AND DEFROSTING UNIT

This invention relates in general to a locomotive cab heater, and more particularly to a locomotive electric cab heater and window defroster unit for providing heat to the locomotive cab and for providing defrosting air to the windows.

Heretofore, locomotive cab heaters were of the hot water type. Such hot water type heaters provided unsatisfactory defrosting air and excessive heat to the cab. Moreover, heretofore known hot water heaters have been heavy and bulky in size, taking up considerable room within the cab of a locomotive. Hot water heaters have also been hazardous in the event of accident by the loss of water and have required considerable warm-up time before any effective heat is produced.

The present invention obviates the difficulties heretofore known in hot water heaters and further provides other features not possible with hot water heaters. More specifically, the present invention is all electrically operated utilizing electric heating panels for producing heat which are capable of rapid warm-up to provide heat quickly when needed. Moreover, the output of the electric heater of the invention is independent of locomotive throttle position. The present invention includes a forced air system having a fan for pumping air over heating panels. In the event of fan malfunction, the power to the heating panels is substantially reduced, thereby protecting against overheating conditions. A separate blower is provided for producing defrosting air independent of the heated air produced by the heater. Controls enable two levels of heat control as well as recirculation of air where no heat is needed. In the event of a circulating fan failure, a reduced heat output is provided by virtue of the heat path design which permits free convection through the heater.

It is therefore an object of the present invention to provide a new and improved locomotive cab heater wherein the heater is electrically operated, enabling it to be small and compact in size.

Another object of this invention is in the provision of a combination locomotive electric cab heater and window defrosting unit which has a heat path design that is failsafe and which can provide the cab with heat in the event of failure of the circulating air system without causing overheating of the unit.

A further object of this invention resides in the provision of a combination locomotive electric cab heater and window defrosting unit capable of rapid warm-up and output independent of locomotive throttle position.

A still further object of this invention is to provide a combination locomotive cab heater and defrosting unit having a defrost operation independent of the heating operation.

Other objects, features and advantages of the invention will be apparent from the following detailed disclosure, taken in conjunction with the accompanying sheets of drawings, wherein like reference numerals refer to like parts, in which:

FIG. 1 is an inside perspective view of a locomotive cab looking forward and illustrating the mounting position of the combination locomotive cab heater and defroster according to the invention;

FIG. 2 is a greatly enlarged front elevational view of the cab heater and defroster according to the invention;

FIG. 3 is a front perspective view of the heater and defroster unit according to the invention with the covers removed;

FIG. 4 is a top and front perspective view of the unit shown in FIG. 3 and in slightly enlarged form;

Figure 5:
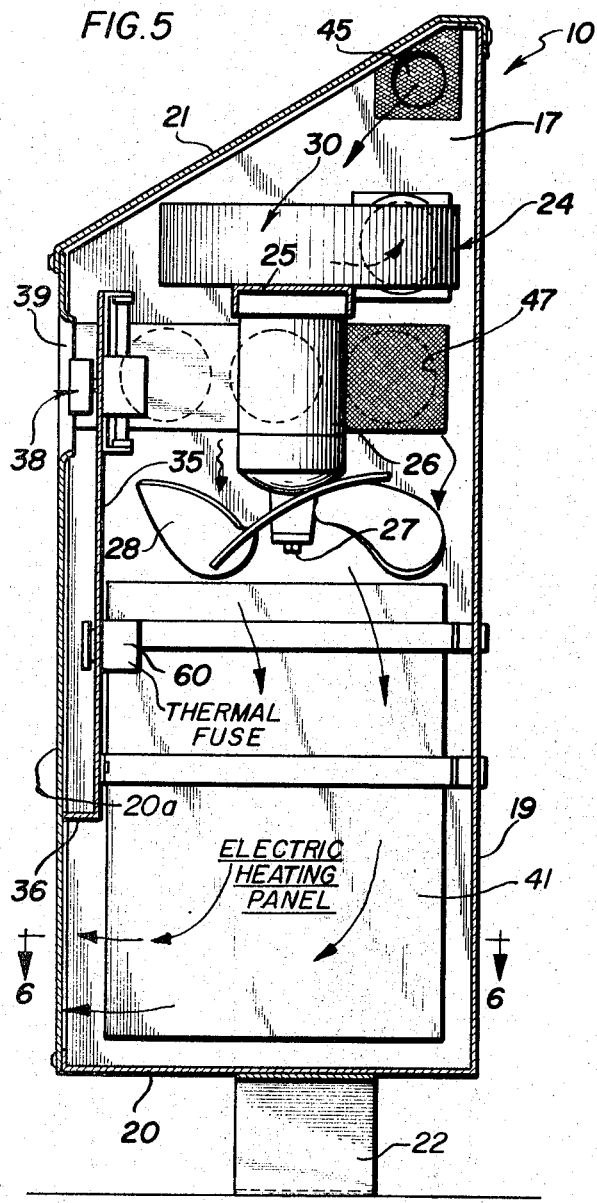
FIG. 5 is a vertical sectional view taken substantially along line 5—5 of FIG. 2 but showing some parts in elevation.
Figure 6:
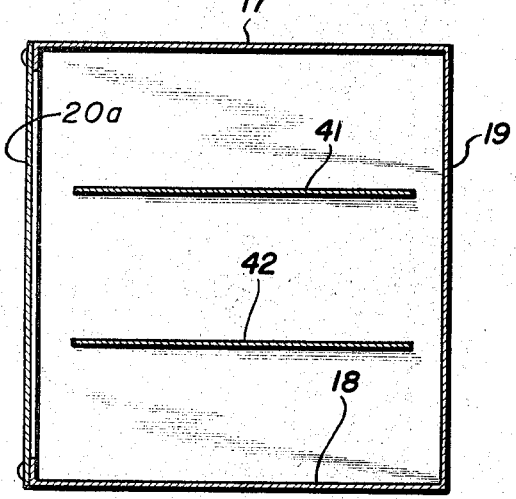
FIG. 6 is a horizontal sectional view taken substantially along line 6—6 of FIG. 5.

The present invention may take the form of a locomotive cab heater or preferably be in the form of a combination locomotive cab heater and defroster unit, so as to provide heat for a locomotive cab and defrosting action for the windows of the cab. Where the form is of only a cab heater, such as generally designated by the numeral 9 in FIG. 1, it may be of the recessed type for fitting within an opening within a wall of a cab 10. When the invention is in the form of a cab heater and defroster unit, such as generally indicated by the numeral 11, it may be of the console type where it is mounted on the floor of the cab, such as adjacent the forward right-hand corner, as depicted in FIG. 1. The difference between the cab heater 9 and the combination cab heater and defroster 11 is generally in the air pumping elements wherein only a fan need be provided in the heater for circulating air through the housing, while a fan and a blower are provided for the combination heater and defroster for not only pumping air through the unit but also developing defrosting air for the windows 12 of the cab. While the cab heater 9 is shown mounted in the forward wall of the cab and the combination heater and defroster 11 is shown at the front of the cab compartment, it should be appreciated that they can be mounted in other locations if so desired.

The combination heater and defroster 11 provides defrosting air to a distribution duct 13 which is connected to a conduit 14 extending from the unit 11. The distribution duct 13 is shown in phantom and merely shows the manner in which the defrosting air may be distributed to the windows. While the distribution duct 13 shows only the feeding of defrosting air to the front windows, it should be appreciated that other distribution ducts may be added for distribution air to the side windows if so desired. The other settings would be applied to the defrosting air outlet 15 of the unit.

Referring now particularly to the heater and defroster unit 11, as seen particularly in FIGS. 2, 3, 4, 5 and 6, the unit includes a housing having opposed side walls 17 and 18 extending forward from a rear wall 19 and a bottom wall 20. The opposed side walls 17 and 18, as noted particularly in FIG. 5, are inclined along their upper edges downwardly toward the front of the housing. An outer front panel 20a encloses the front of the housing, while an upper panel 21 encloses the upper end of the housing. As noted particularly in FIGS. 2, 3 and 5, a bracket 22 is mounted on the bottom wall 20 to slightly space the bottom wall of the housing above the floor of the cab.

Within the housing a blower fan unit 24 is mounted on a supporting panel 25 which extends between and is attached to the opposite side walls 17 and 18, and it is noted that the blower fan unit is arranged adjacent the upper end of the housing.

The blower fan unit 24 includes a common motor 26 having a shaft 27 that extends from the motor at both ends thereof. On the lower end of the shaft, a fan blade assembly 28 is mounted for pumping air through the housing. At the upper end of the shaft 27 an impeller 29 of a centrifugal blower 30 is mounted to develop defrosting air and discharge it through the defrosting air outlet 15. The blower 30 includes a housing 31 mounted on the supporting panel 25 and in which the impeller 29 is arranged. The housing 31 includes an air inteke 32 and an air discharge 33 that is connected to the defrosting air outlet 15.

A vertically arranged inner panel 35 is mounted between the opposed side walls 17 and 18 and adjacent the front cover 20a. This panel extends downwardly from the upper end of the cover 20a and terminates in a forwardly extending baffle 36. A cutout 37 is provided at the upper right-hand corner of this panel. A control switch 38 is mounted on the panel 35 adjacent the upper end and in alignment with an opening 39 formed in the front cover 20a so that access can be had to the switch when the cover is in place. The lower baffle 36 extends forward to the front cover 20a, as shown in FIG. 5, to prevent air being pumped through the housing to directly return to the inlet side of the fan assembly by moving between the panels 20a and 35 before being pumped into the cab compartment.

A pair of vertically extending and parallel arranged heating panels 41 and 42 are supported in upstanding position on the bottom wall 20 and below the fan blade assembly 28. When the panels are energized, it can be appreciated that air pumped over the panels will pick up heat.

The air flow path through the housing of the unit is generally from the upper end of the unit downwardly into the lower end of the unit. Air inlets 45 are provided in the opposite side walls 17 and 18 and at the very top to permit the entrance of air at a level above the intake opening 32 of the centrifugal blower. Additional air inlet openings 46 are provided in the back wall 19 of the housing, some of which are positioned above the air intake opening 32 and some of which are below thereof. Still further air inlet openings 47 are provided in the side walls 17 and 18. The air inlet openings 47 are at a level below that of the air intake of the blower 30 but above the inlet side of the fan assembly 28.

It therefore can be appreciated air is allowed to enter the housing at various levels in order to give a sufficient amount of air to be pumped through the housing downwardly and through the lower opening 48, as seen in FIGS. 3 and 4, which aligns with a lowered opening 49 formed in the front cover 20a. Accordingly, air exiting the louvered opening 49 will have passed across or over the heating panels 41 and 42 and picked up heat. The defrosting air is not heated by the panels prior to discharge from the housing of the unit as it enters the air intake of the blower at the upper part of the chamber within the housing. It will be noted that the blower is of a size smaller than the horizontal cross-section within the housing such that air can also move down along the sides of the blower when pumped by the fan 28. The arrows in FIGS. 4 and 5 indicate air flow in this direction during normal operation of the heater. It will be appreciated that the back wall and the side walls of the unit are not jammed tight against any walls of the locomotive cab in order to allow air flow into the openings in the side and back walls. Air moving through the lower opening 48 and ultimately through the louvered opening 49 cannot return directly to the interior of the housing because of the baffle 36.

In order to provide the heat path through the unit failsafe in the event of the failure of the motor 50 and the forced air system, a thermal fuse 60 which opens the circuit to a portion of the heating panels 41 and 42 in the event that it reaches a given temperature is mounted adjacent the upper ends of the panels 41 and 42, as particularly seen in FIG. 5. In that event, a reduced heat level is still available to the cab by free convection of air through the supply opening 49 and opening 48 upwardly through the chamber of the housing and out the upper inlet openings. Accordingly, the air flow is then reversed from what it would normally be when the fan is operating.

Figure 7:
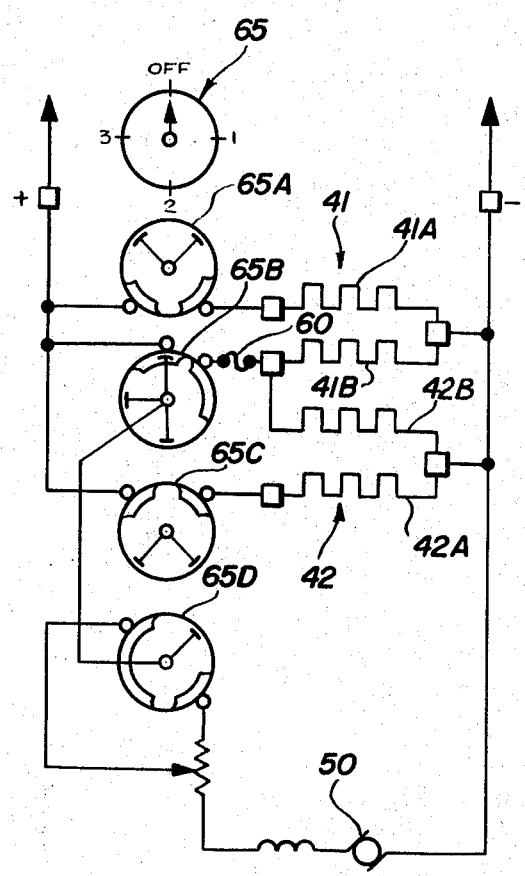
FIG. 7 is an electrical schematic diagram of the controls for operating the motor and heating panels of the unit according to the invention.

A schematic diagram of the control switch 22 is shown in FIG. 7 wherein a four-position switch 65 having four contact plates 65A, 65B, 65C and 65D provide operation of the unit with two levels of heating, and blower and fan operation only where no heat is needed but defrosting action is desired. Switch arms, one for each contact plate, rotate together. The heating panels 41 and 42 include four heating elements 41A, 41B, 42A and 42B operable depending upon the position of the switch 65 and whether the fuse 60 is open. The illustrated positions of the switch arms for the contact plates are that when the switch is in the off position and the heating elements are de-energized. Turning the switch to position No. 1 causes the switch arms to rotate ninety degrees and energize the motor 26 together with the heating elements 41B and 42B to provide forced air circulation at a low heat level and defroster operation. Turning the switch to position No. 2, which is another ninety degrees, maintains the motor in operation and additionally energizes the heating element portions 41A and 42A to provide high heat condition. Turning the switch another ninety degrees to the third position de-energizes all of the heating elements but maintains the motor 26 in operation to continue the operation of the defroster blower 30 and the circulating fan 28. It should be appreciated that the switch controls could be set up to provide additional levels of heat, if so desired. When the heat sensitive fuse 60 opens, in the event that the switch is in position No. 2, the heating elements 41B and 42B will be de-energized, thereby reducing the heat output of the heating panels to a safe level and avoid any dangerous conditions while still providing free convective heat flow through the unit and some heat to the cab.

It should further be appreciated the cab heater 9 differs only in that it does not include a blower for producing defrosting air. As seen in FIG. 1, the front panel includes upper air inlet 70, lower air outlet or supply 71 and intermediate air inlet 72. It operates to provide heat in the same manner as the unit 11.

In view of the foregoing, it can be appreciated that the locomotive electric cab heater and window defrosting unit of the invention permits more efficient and safe heating of a locomotive cab with a failsafe heat path which provides reduced heat to the cab in the event of an air circulation failure.

It will be understood that modifications and variations may be effected without departing from the scope of the novel concepts of the present invention, but it is understood that this application is to be limited only by the scope of the appended claims.

The invention is hereby claimed as follows:

1. A locomotive electric cab heater and window defroster unit for a locomotive cab comprising an upright housing, an air inlet means adjacent the upper end of the housing for receiving recirculating air, a centrifugal blower adjacent the air inlet means having an intake communicating with the interior of the housing and a discharge connected to a defroster conduit leading from the housing, a fan below the blower for driving air downwardly through the housing, a common motor driving the blower and fan, electric heating panels mounted within the housing below the fan, an outlet at the lower end of the housing for discharging heated air into the cab, and control means for said unit including means for reducing power to the heating panels in the event the motor falls whereby convective air movement upwardly through the housing between the lower opening and the upper intake continues to provide heat to the cab.

2. The combination as defined in claim 1, wherein said heating panels are upstanding and parallel spaced.

3. The combination as defined in claim 2, wherein said control means includes switching means for energizing part, all or none of the heating panels while the motor for driving the blower and fan is energized.

4. The combination as defined in claim 1, wherein said air inlet means includes at least one opening in the housing above the blower intake and at least one opening in the housing above the fan and below the blower intake.

5. The combination as defined in claim 4, wherein the blower is arranged within the housing so that part of the air from the opening above the blower intake can flow around the blower to the fan.

6. The combination as defined in claim 1, wherein said means for reducing the power to the heating panels includes a heat sensitive fuse positioned in the housing below the fan.

7. A combination locomotive cab heater and window defroster unit comprising, a housing defining an upright air flow chamber, air inlet means for said chamber at the upper end of the housing, air outlet means for said chamber at the lower end of the housing, a centrifugal blower in said chamber adjacent the upper end of the chamber having an intake receiving air as it first enters the chamber through the air inlet means and a discharge connected to a defroster conduit leading from the housing, said blower being sized smaller than the cross sectional area of the chamber, a circulating fan below the blower for pumping air through the chamber and out the air outlet means, a motor between the blower and fan for driving same, and electrically energized heating panels in said chamber adjacent the air outlet means for heating the air flow prior to discharge from the chamber through said air outlet means.

8. The combination as defined in claim 7, and means in the chamber above said heating panels for de-energizing some of the panels in the event the motor fails.

* * * * *

UNITED STATES PATENT OFFICE
CERTIFICATE OF CORRECTION

Patent No. 3,855,450   Dated December 17, 1974

Inventor(s) Jon F. O'Connor

It is certified that error appears in the above-identified patent and that said Letters Patent are hereby corrected as shown below:

Col. 3, line 58, change "lowered" to --louvered--;

Col. 5, line 23, change "falls" to --fails--.

Signed and sealed this 18th day of March 1975.

(SEAL)
Attest:

RUTH C. MASON
Attesting Officer

C. MARSHALL DANN
Commissioner of Patents
and Trademarks